United States Patent [19]

Eng

[11] 4,395,336

[45] Jul. 26, 1983

[54] METHOD OF ABSORBING LIQUIDS

[75] Inventor: Kjell Eng, Mullsjö, Sweden

[73] Assignee: AB Eiser, Boras, Sweden

[21] Appl. No.: 414,316

[22] Filed: Sep. 2, 1982

Related U.S. Application Data

[62] Division of Ser. No. 117,977, Feb. 4, 1980, abandoned.

[30] Foreign Application Priority Data

Feb. 16, 1979 [SE] Sweden .............................. 7901400

[51] Int. Cl.³ .............................................. B01D 15/00
[52] U.S. Cl. .................................... 210/693; 210/924; 428/224; 428/257
[58] Field of Search .................. 210/693, 924; 66/202; 428/253, 257, 224

[56] References Cited

U.S. PATENT DOCUMENTS

| 3,966,597 | 6/1976 | Omori et al. | 210/693 |
| 4,280,342 | 7/1981 | Eng et al. | 66/202 |
| 4,340,486 | 7/1982 | Swanson | 210/693 |

FOREIGN PATENT DOCUMENTS 351232 11/1972 Sweden .

Primary Examiner—James J. Bell
Attorney, Agent, or Firm—Harness, Dickey & Pierce

[57] ABSTRACT

A liquid-absorbing textile product which is in the form of a double-layer fabric wherein the two layers are interwoven by pile threads of a hydrophobic and oleophilic synthetic material. The resulting product is very manageable and capable of absorbing considerable quantities of oil despite its low weight.

12 Claims, 8 Drawing Figures

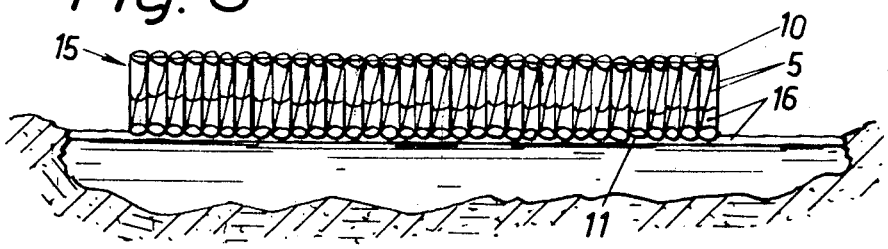
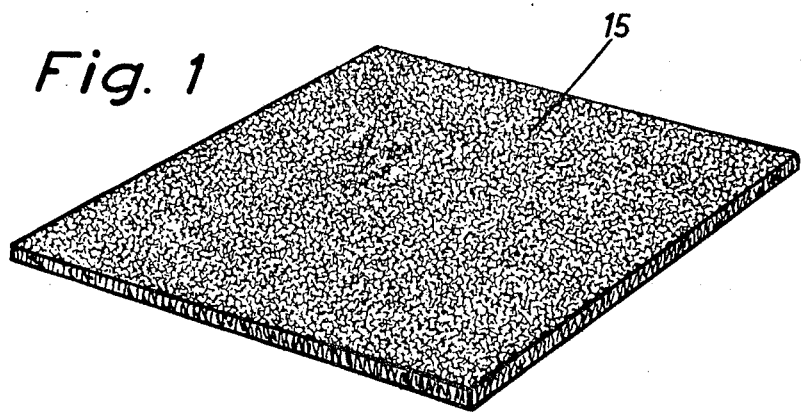
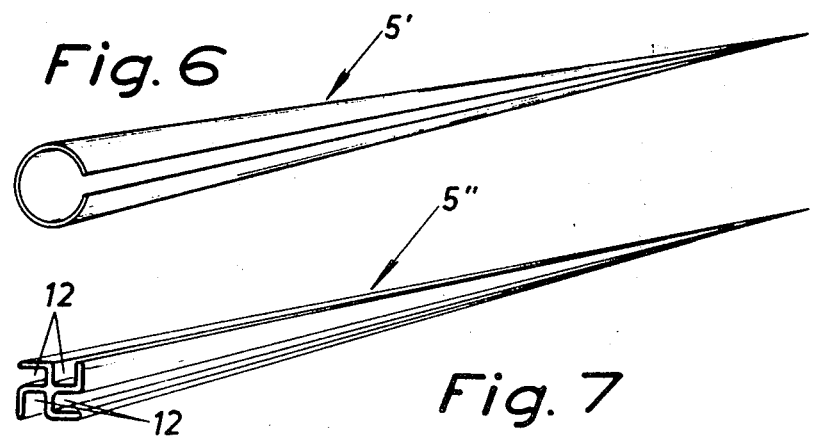

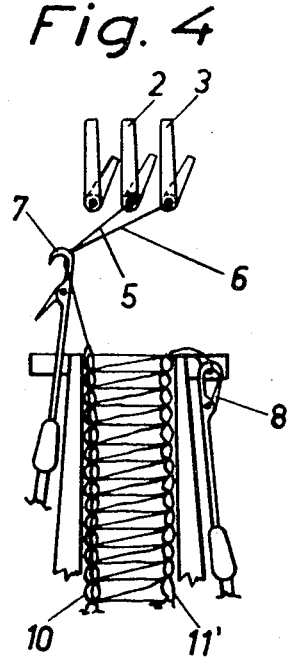
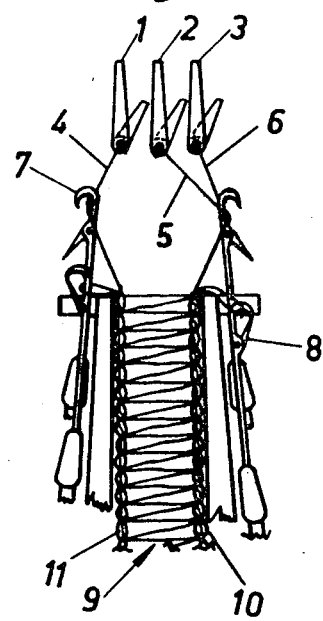
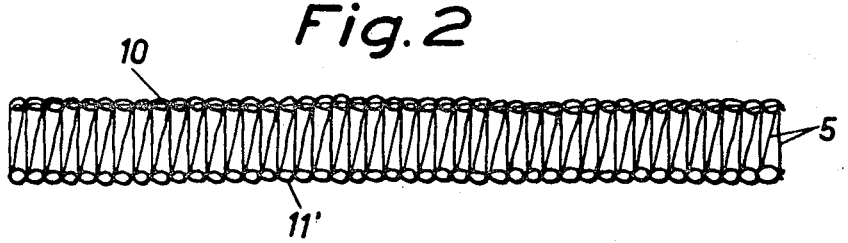
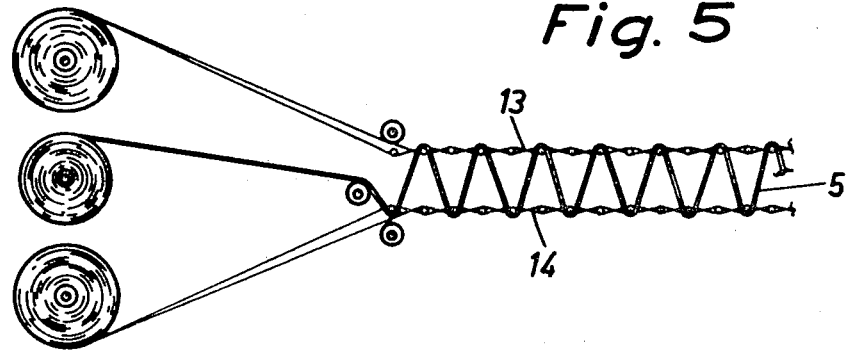

METHOD OF ABSORBING LIQUIDS

This is a division of application Ser. No. 117,977, filed Feb. 4, 1980, now abandoned.

BACKGROUND OF THE INVENTION

Spilling and leakage of oil onto the ground, and particularly an arable land and fields, as my happen in case of accidents involving petrol trucks, it is essential that the oil is collected before it has had time to seep down into the soil, polluting both the soil and the subsoil water. The collection and removal of the oil from the ground obviously becomes even more difficult, if the accident occurs immediately after heavy rains, that have made the soil soft and covered it with pools of water.

Hitherto, collection of oil under such circumstances has been carried out with the aid of shredded of flocculent cellular plastics which are scattered over the oil-polluted areas. One disadvantage inherent in this kind of method is that the oil that is absorbed by the cellular plastics cannot be retrieved for re-use. In addition, it is difficult to spread the minute plastics particles under windy weather conditions.

In accordance with another prior-art method a textile product is used which consists of a felt-like batt the fibres of which having been given a definite orientation in a carding operation and thereafter been needled or bonded together.

SUMMARY OF THE SUBJECT INVENTION

The subject invention concerns a carpet-like textile product which has been conceived for the purposes indicated and which does not suffer from the disadvantages outlined above. The textile product in accordance with the invention in characterised in that it is a double-layer fabric incorporating pile threads of a hydrophobic but oleophilic synthetic material, said pile threads interconnecting the two fabric layers. The gap between the two layers of the product, which layers are kept apart by the pile threads, is used to collect the oil floating for instance on the surface of water, and owing to the oleophilic nature of the pile threads, the oil is retained in this gap when the product, which may be in the form of a carpet, is lifted off the water surface. A textile product of this kind is capable of absorbing and holding considerable quantities of oil which later may be removed from the textile product in a suction operation or in a centrifugal separation process and the oil thus retrieved may be re-used. In addition, a textile product of this kind is very manageable, wear-resistant and durable. After oil-removal and cleansing it may be used repeatedly.

BRIEF DESCRIPTION OF THE DRAWINGS

The invention and its characteristic features will be described in closer detail in the following with reference to the accompanying drawings, wherein FIG. 1 is a perspective view of a square piece of the textile product of the invention, designed to absorb oil, FIG. 2 shows on an enlarged scale a cross-sectional view through a warp knit fabric from which the textile product piece shown in FIG. 1 is taken, FIGS. 3 and 4 show schematically a portion of a warp knitting machine in which is manufactured the warp knit fabric serving as the oil-absorbing textile product in accordance with the invention, FIG. 5 illustrates schematically a manner of manufacturing the textile product through weaving, FIGS. 6 and 7 show on an enlarged scale and in perspective views two different shapes of the pile threads used in the textile product of the invention, and FIG. 8 is a vertical cross-sectional view through a textile product in accordance with the invention when used to collect oil from the upper surface of a pool of water.

DETAILED DESCRIPTION OF A PREFERRED EMBODIMENT

FIG. 3 illustrates the manner in which a double-knit warp fabric 9 is made from threads 4, 5, and 6, supplied by yarn guides, 1, 2, and 3, with the aid of latch needles 7 and 8. The pile thread 5 forms meshes 10, 11 both with thread 4 and with thread 6.

The knit fabric may be manufactured in a raschel loom or warp frame of any known kind. The knitting pattern is independent of the invention.

As illustrated in FIG. 4, it is possible to knit the fabric in such a manner that meshes 10 are formed by threads 5 and 6 at one side of the fabric whereas at the opposite side of the fabric meshes 11' are formed exclusively by threads 5. FIG. 2 shows a piece of fabric cut off from a knit fabric produced in this manner.

The material of at least the pile threads 5 but preferably also of threads 4 and/or threads 6 consists of a hydrophobic, oleophilic synthetic material having a size of e.g. between 300 and 500 decitex. Suitable materials of this kind are e.g. polypropylene and polyethylene.

Preferably, the fabric is rather closely knit. The density of the pile threads should be between 35 and 45 threads per square centimeter, preferably about 40 threads per square centimeter. The product should have a thickness of approximately 1 to 2 centimeters, preferably about 1.5 centimeters.

In order to increase the oil-absorbing properties of the textile product it is suggested in accordance with the invention that the threads 4, 5, and 6, but particularly the pile threads 5, be formed with lengthwise extending grooves or channels. FIG. 6 shows a tube-shaped pile thread 5' which on account of its extraordinary capillary effect is capable of absorbing and to be almost entirely filled with oil.

FIG. 7 illustrates a pile thread 5" having a swastika-shaped cross-sectional configuration. The lengthwise channels 12 absorb and hold a considerable amount of oil.

Star-shapes may also be used as well as other cross-sectional configurations that enlarge the surface area of the pile thread considerably while at the same time increasing its adhesive capabilities. Irregular cross-sectional shapes are likewise possible.

Practical tests with the textile product in accordance with the invention have proved that it is capable of absorbing oil of grade SAE 30 in quantities amounting to between 25 and 30 times the weight of the textile product itself. After removal of the oil by squeezing or suction the textile product is practically completely clean and may be used again.

In order to remove the oil from the textile product a suction box can be used above which the textile product, laden with oil, is allowed to travel. Roller presser devices or centrifuge means could be used for the same purpose. Despite rough handling, the textile product may be used several times after expulsion of the oil.

Other double-layer textile products than warp knit fabrics may be used in accordance with the invention. As one example could be mentioned the textile product shown in FIG. 5 which comprises two weaves 13, 14 which are interwoven by pile threads 5. Obviously, the pile threads 5 should be woven much closer than is indicated by the schematic illustration in FIG. 5.

When a field has been polluted by oil from e.g. an overturned petrol car, as mentioned in the introduction hereto, and is to be cleansed and depolluted, the following mode of action is suggested in accordance with the invention. A number of pieces 15 of the textile product shown in FIG. 1, made from knitted or woven material in the manner indicated above, are positioned on the pools of oil. As appears from FIG. 8, on account of the capillary effect and the adhesion between the thread material and the oil, the oil 16 will be attracted by and absorbed into the textile pieces 15, filling the gap between the threads 5. The oil-laden textile pieces 15 are then thrown onto a container (not shown) which is mounted on a truck or a tractor to be further transported to a cleansing device comprising a centrifuge or a suction box. In case the oil quantities to be thus collected are considerable, a squeezing or pressing device, such as a roller presser may be installed at the place of accident and the oil 16 be removed in situ from the textile pieces which can thereafter be used again immediately.

The textile product in accordance with the invention could likewise be used to collect oil spilled or discharge at sea, and in lakes or rivers. In this case the textile product should of course have a different shape from the one illustrated in FIG. 1. In such cases it is preferable to use a driven, endless web of the textile product.

What I claim is:

1. The method of picking up petroleum spills comprising the steps of placing a blanket made of an improved liquid-absorbing textile product of a double-layer fabric comprising pile threads of a hydrophobic and oleophilic synthetic material, said pile threads interconnecting the two layers of said double-layer fabric in contact with the spill for absorption of the petroleum into said blanket and removing the blanket and adsorbed petroleum.

2. The method as claimed in claim 1 wherein all threads incorporated in said textile fabric consist of a hydrophobic and oleophilic synthetic material.

3. The method as claimed in claim 1, wherein at least said pile threads are formed with lengthwise extending channels.

4. The method as claimed in claim 3, wherein said pile threads have a swastika-shaped cross-sectional configuration.

5. The method as claimed in claim 3 wherein said pile threads are tubular.

6. The method as claimed in claim 3 wherein said pile threads have an irregular cross-sectional configuration.

7. The method as claimed in claim 1 wherein said textile product has a density of approximately 35 to 45 pile threads per square centimeter, preferably about 40 pile threads per square centimeter.

8. The method as claimed in claim 1 wherein the thickness of said textile product is between 1 and 2 centimeters, preferably approximately 1.5 centimeters.

9. The method as claimed in claim 1 wherein said textile product is a double-layer fabric, wherein threads from two thread systems are used to knit said fabric, one of said layers being made by the meshes formed by the threads from both said thread systems, whereas the other one of said layers is made by the meshes formed by the threads from only one of said two thread systems.

10. The method as claimed in claim 1 wherein said textile product is a double-layer woven product, the two woven webs of said weaves interwoven by said pile threads.

11. An improved liquid-absorbing textile product as claimed in claim 1 wherein at least said pile threads are polyethylene threads.

12. An improved liquid-absorbing textile product as claimed in claim 1 wherein at least said pile threads are polypropylene threads.

* * * * *